United States Patent
Matsumura et al.

(10) Patent No.: US 11,212,052 B2
(45) Date of Patent: Dec. 28, 2021

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 14 days.

(21) Appl. No.: 16/624,092

(22) PCT Filed: Jun. 23, 2017

(86) PCT No.: PCT/JP2017/023296
§ 371 (c)(1),
(2) Date: Dec. 18, 2019

(87) PCT Pub. No.: WO2018/235297
PCT Pub. Date: Dec. 27, 2018

(65) Prior Publication Data
US 2020/0153577 A1 May 14, 2020

(51) Int. Cl.
*H04L 5/00* (2006.01)
*H04J 13/22* (2011.01)
(Continued)

(52) U.S. Cl.
CPC ............ *H04L 5/0048* (2013.01); *H04J 13/22* (2013.01); *H04L 5/0035* (2013.01);
(Continued)

(58) Field of Classification Search
CPC .................................................... H04W 48/16
See application file for complete search history.

(56) References Cited

U.S. PATENT DOCUMENTS 10,447,445 B2 * 10/2019 Park ................. H04W 72/0453
2010/0173642 A1 7/2010 Iwai et al.
(Continued)

FOREIGN PATENT DOCUMENTS

| CN | 106850118 A | 6/2017 |
| JP | 2014-116975 A | 6/2014 |
| WO | 2016114544 A1 | 7/2016 |

OTHER PUBLICATIONS

International Search Report issued in PCT/JP2017/023296 dated Aug. 29, 2017 (1 page).
(Continued)

*Primary Examiner* — Fahmida S Chowdhury
(74) *Attorney, Agent, or Firm* — Osha Bergman Watanabe & Burton LLP

(57) ABSTRACT

A user terminal according to one aspect of the present invention includes: a transmission section that transmits a UL signal; and a control section that decides a number of sequences equal to or less than a defined overall number of sequences based on information and/or a sequence length notified from a base station, and controls the transmission of the UL signal to which a sequence number selected from the number of sequences has been applied. According to one aspect of the present invention, it is possible to appropriately control UL transmission even when a larger number of cell IDs is configured to a radio communication system than to existing LTE systems.

4 Claims, 9 Drawing Sheets

(51) Int. Cl.
  *H04W 16/28* (2009.01)
  *H04W 48/16* (2009.01)
  *H04W 72/04* (2009.01)
(52) U.S. Cl.
  CPC .......... *H04L 5/0053* (2013.01); *H04L 5/0073* (2013.01); *H04W 16/28* (2013.01); *H04W 48/16* (2013.01); *H04W 72/0466* (2013.01)

(56) References Cited

U.S. PATENT DOCUMENTS

| | | | |
|---|---|---|---|
| 2015/0163729 A1* | 6/2015 | Seo | H04B 7/2656 370/336 |
| 2016/0219587 A1* | 7/2016 | Lin | H04L 5/0044 |
| 2017/0367074 A1* | 12/2017 | Zhang | H04L 5/003 |
| 2018/0006864 A1* | 1/2018 | Hwang | H04L 5/0094 |
| 2018/0034607 A1* | 2/2018 | Kim | H04L 5/0048 |
| 2019/0020436 A1* | 1/2019 | Suzuki | H04J 11/0069 |
| 2020/0245326 A1 | 7/2020 | Iwai et al. | |

OTHER PUBLICATIONS

Written Opinion of the International Searching Authority issued in PCT/JP2017/023296 dated Aug. 29, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action issued in counterpart Chinese Application No. CN201780093935.0 dated Aug. 4, 2021 (11 pages).

* cited by examiner

| u | $\varphi(0), ..., \varphi(35)$ | |
|---|---|---|
| 30 | -1 | 3 |
| 31 | 1 | 3 |
| 32 | -3 | 1 |
| ... | ... | ... |
| 57 | -1 | 1 |
| 58 | 1 | -1 |
| 59 | 3 | -1 |

FIG. 2

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE (also referred to as LTE Rel. 8 or 9), LTE-Advanced (LTE-A that is also referred to as LTE Rel. 10, 11 or 12) has been specified. Successor systems of LTE (referred to as, for example, Future Radio Access (FRA), the 5th generation mobile communication system (5G), 5G+ (plus), New Radio (NR), New radio access (NX), Future generation radio access (FX) or LTE Rel. 13, 14, 15 or subsequent releases) have been also studied.

Furthermore, according to existing LTE systems (e.g., LTE Rel. 8 to 13), a user terminal (UE: User Equipment) transmits Uplink Control Information (UCI) by using a UL control channel (e.g., a Physical Uplink Control Channel (PUCCH)) and/or a UL data channel (e.g., a Physical Uplink Shared Channel (PUCCH)). A configuration (format) of the UL control channel is also referred to as a PUCCH format.

The UCI includes at least one of a Scheduling Request (SR), retransmission control information (also referred to as Hybrid Automatic Repeat reQuest-Acknowledge (HARQ-ACK) or ACK/NACK (Negative ACK)) for DL data (DL data channel (PDSCH: Physical Downlink Shared Channel)), and Channel State Information (CSI).

CITATION LIST

Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., 5G and/or NR) are expected to realize various types of radio communication service while meeting respectively different request conditions (e.g., an ultra high speed, a large volume and ultra low latency).

For example, it is studied for 5G/NR to provide radio communication service that is referred to as an enhanced Mobile Broad Band (eMBB), massive Machine Type Communication (mMTC) and Ultra Reliable and Low Latency Communications (URLLC).

By the way, it is studied for 5G/NR to apply a DMRS-based PUCCH (DMRS-based transmission or a DMRS-based PUCCH) and/or a sequence-based PUCCH (sequence-based transmission or a sequence-based PUCCH) as a PUCCH transmission scheme. The former is a method for notifying UCI by transmitting a UL signal obtained by performing Time Division Multiplexing (TDM) and/or Frequency Division Multiplexing (FDM) on a DeModulation Reference Signal (DMRS) and the UCI. The latter is a method for notifying UCI by transmitting a UL signal that uses a code resource associated with a UCI value without using a DMRS.

Furthermore, it is studied for 5G/NR to increase the number of cell identifiers (cell IDs (cell identifier/identity) (e.g., 1000) compared to the number of cell IDs (504) of existing LTE systems (prior to Rel. 13) and control communication. The existing LTE systems control generation of a UL signal by using the number of sequences that is a certain number (e.g., 30) for a UL reference signal (e.g., UL DMRS) by taking cell IDs into account.

However, when the number of cell IDs increases and when the same number of sequences as those of the existing systems is used to perform UL transmission, there is a risk that a probability that UL transmission that applies the same sequences between neighbor cells is performed increases, and an influence of an inter-cell interference becomes significant. As a result, there is a risk that a communication throughput lowers.

It is therefore one of the objects of the present invention to provide a user terminal and a radio communication method that can appropriately control UL transmission even when a larger number of cell IDs is configured to a radio communication system than to the existing LTE systems.

Solution to Problem

A user terminal according to one aspect of the present invention includes: a transmission section that transmits a UL signal; and a control section that decides a number of sequences equal to or less than a defined overall number of sequences based on information and/or a sequence length notified from a base station, and controls the transmission of the UL signal to which a sequence number selected from the number of sequences has been applied.

Advantageous Effects of Invention

According to the present invention, even when a larger number of cell IDs is configured to a radio communication system than to the existing LTE systems, it is possible to appropriately control UL transmission.

BRIEF DESCRIPTION OF DRAWINGS

FIG. 2 is a diagram illustrating one example of a table for defining second sequences when the number of PRBs of a transmission signal is three (=a sequence length is 36).

DESCRIPTION OF EMBODIMENTS

Figure 1A:
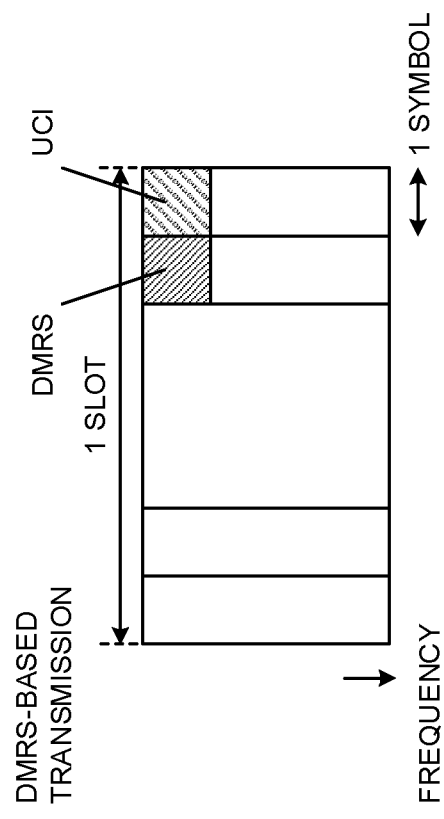
FIGS. 1A and 1B are diagrams illustrating one example of DMRS-based transmission and sequence-based transmission.

It is studied for future radio communication systems (e.g., LTE Rel. 14, and subsequent releases, 5G and NR) to introduce a plurality of numerologies instead of a single numerology.

The numerology may be a communication parameter that is applied to transmission and/reception of a certain signal and/or channel, and may indicate at least one of, for example, a Sub-Carrier Spacing (SCS), a bandwidth, a symbol length, a cyclic prefix length, a subframe length, a Transmission Time Interval (TTI) length (e.g., slot length), the number of symbols per TTI, a radio frame configuration, filtering processing and windowing processing.

Furthermore, it is studied for the future radio communication systems to introduce the same and/or different time units (also referred to as, for example, subframes, slots, mini slots, sub slots, TTIs, short TTIs (sTTI) and radio frames) as and from those of existing LTE systems (prior to LTE Rel. 13) accompanying support of a plurality of numerologies.

In addition, the TTI may indicate a time unit for transmitting and receiving a transport block, a code block and/or a codeword of transmission/received data. When the TTI is given, a time interval (e.g., the number of symbols) in which a transport block, a code block and/or a codeword of data are actually mapped may be shorter than the TTI.

When, for example, the TTI includes a certain number of symbols (e.g., 14 symbols), the transport block, the code block and/or the codeword of transmission/received data may be transmitted and received in one to a certain number of symbol intervals of the symbols. When the number of symbols for transmitting and receiving the transport block, the code block and/or the codeword of the transmission/received data is smaller than the number of symbols in the TTI, a reference signal and a control signal can be mapped on symbols on which data is not mapped in the TTI.

A subframe may be a time unit having a certain time duration (e.g., one ms) irrespectively of numerologies used by (and/or configured to) a user terminal (e.g., UE: User Equipment).

On the other hand, a slot may be a time unit based on the numerologies used by the UE. When, for example, a subcarrier spacing is 15 kHz or 30 kHz, the number of symbols per slot may be 7 or 14 symbols. When the sub-carrier spacing is 60 kHz or more, the number of symbols per slot may be 14 symbols. Furthermore, the slot may include a plurality of mini (sub) slots.

It is studied for these future radio communication systems to support a UL control channel (referred to as a short PUCCH below) of a shorter duration than a Physical Uplink Control Channel (PUCCH) format of the existing LTE systems (e.g., LTE Rel. 8 to 13), and/or a UL control channel (referred to as a long PUCCH below) of a longer duration than the shorter duration.

The short PUCCH (a short PUCCH or a shortened PUCCH) includes a certain number of symbols (e.g., two or three symbols) in a certain SCS. On the short PUCCH, Uplink Control Information (UCI) and a Reference Signal (RS) may be subjected to Time Division Multiplexing (TDM) or may be subjected to Frequency Division Multiplexing (FDM). The RS may be, for example, a DeModulation Reference Signal (DMRS) used to demodulate the UCI.

An SCS of each symbol of the short PUCCH may be the same as or higher than an SCS of a data channel symbol (also referred to as a data symbol below). A data channel may be, for example, a downlink data channel (PDSCH: Physical Downlink Shared Channel) or an uplink data channel (PUSCH: Physical Uplink Shared Channel).

Hereinafter, the "PUCCH" simply described may be read as a "short PUCCH", a "long PUCCH", and a "short PUCCH and/or a long PUCCH".

The PUCCH may be subjected to TDM and/or FDM with a UL data channel (also referred to as a PUSCH below) in a slot. Furthermore, the PUCCH may be subjected to TDM and/or FDM with a DL data channel (referred to as a PDSCH below) and/or a DL control channel (referred to as a PDCCH: Physical Downlink Control Channel below) in a slot.

As short PUCCH transmission schemes, DMRS-based transmission (DMRS-based transmission or DMRS-based PUCCH) for notifying UCI by transmitting a UL signal obtained by performing TDM/FDM on the DMRS and the UCI, and sequence-based transmission (sequence-based transmission or sequence-based PUCCH) for notifying UCI by transmitting a UL signal that uses a code resource associated with a UCI value without using a DMRS are studied.

The DMRS-based transmission and the sequence-based transmission will be described with reference to FIGS. 1A and 1B.

FIG. 1A is a diagram illustrating one example of DMRS-based transmission of two symbols. In this example, a specific band of last two symbols in a slot is allocated to a PUCCH. On the PUCCH, a DMRS of the first symbol and UCI of the second symbol are subjected to TDM.

Figure 1B:
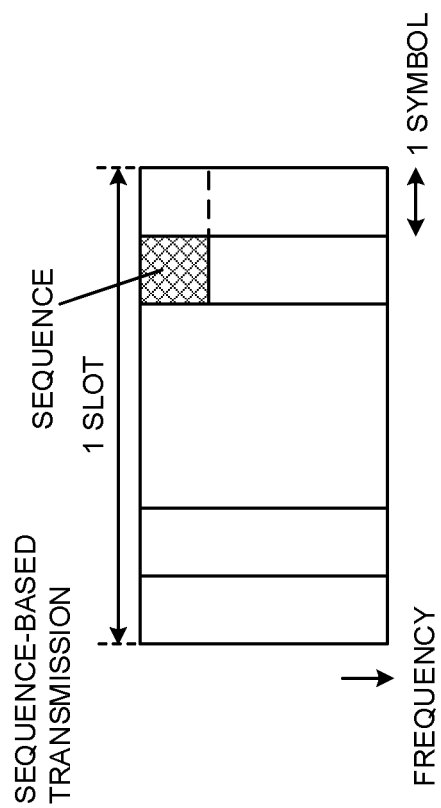

FIG. 1B is a diagram illustrating one example of sequence-based transmission of one symbol. In this example, the same time/frequency resources as those of the DMRS of the DMRS-based transmission are allocated to a PUCCH of the sequence-based transmission. That is, only the first symbol of the time/frequency resources of the DMRS-based transmission is used, and the second symbol is not used.

The DMRS-based transmission transmits the PUCCH including an RS for demodulating the UCI, and therefore may be referred to as coherent transmission or coherent design. The sequence-based transmission notifies the UCI by using the PUCCH that does not include the RS for demodulating the UCI, and therefore may be referred to as non-coherent transmission or non-coherent design.

The sequence-based transmission transmits a UL signal that uses a code resource associated with each UCI value. The code resource is a resource that can be subjected to Code Division Multiplexing (CDM), and may be at least one of a reference sequence, a cyclic shift (phase rotation amount) and an Orthogonal Cover Code (OCC).

Information related to the code resource may be notified from a NetWork (the NW such as a base station) to the UE by higher layer signaling (e.g., Radio Resource Control (RRC) signaling, Medium Access Control (MAC) signaling (e.g., an MAC Control Element (MAC CE)), and broadcast information (e.g., a Master Information Block (MIB) and System Information Block (SIB)), physical layer signaling (e.g., Downlink Control Information (DCI)) or a combination of thereof.

The reference sequence used by the DMRS-based transmission and/or the sequence-based transmission may be a Constant Amplitude Zero Auto-Correlation (CAZAC) sequence (e.g., Zadoff-chu sequence). Alternatively, the reference sequence may be a sequence (Computer Generated CAZAC (CG-CAZAC) sequence) equivalent to the CAZAC sequence given by 3GPP TS 36.211 § 5.5.1.2 (e.g., Table 5.5.1.2-1).

Furthermore, the sequence length of the reference sequence is determined based on a number of subcarriers M and the number of Physical Resource Blocks (PRB). When the DMRS-based transmission and/or the sequence-based transmission are performed by using a band in units of one PRB, the sequence length of the reference sequence is 12 (=12×1). Furthermore, when the DMRS-based transmission and/or the sequence-based transmission are performed by using a band in units of two PRBs, the sequence length of the reference sequence is 24 (=12×2).

By the way, it is studied for 5G/NR to increase the number of cell IDs (e.g., approximately twice (1000)) compared to the number of cell IDs (504) of the existing LTE systems (prior to Rel. 13) and control communication. The existing LTE systems control generation of UL signals by using the number of sequences that is a certain number (e.g., 30) for a UL reference signal (e.g., UL DMRS) taking cell IDs into account.

However, when the number of cell IDs increases and when the same number of sequences as those of the existing systems is used to perform UL transmission, there is a risk that a probability that UL transmission that applies the same sequences between neighbor cells is performed increases, and an influence of an inter-cell interference becomes significant. As a result, there is a risk that a communication throughput lowers.

Hence, it is studied to increase the number of DMRS sequences and/or the number of sequence-based sequences (e.g., the number of CAZAC sequences or the number of Zadoff-chu sequences) for the DMRS-based transmission and/or the sequence-based transmission in a case where the number of cell IDs is increased.

The existing LTE systems apply the number of sequences (e.g., the number of CAZAC sequences) that is 30 when the number of PBRs used for UL transmission is less than six PRBs. More specifically, the existing LTE systems apply 30 sequences (CGS: Computer Generated Sequence) equivalent to the CAZAC sequences defined in advance in the table when the number of PRBs is less than three. The existing LTE systems generate UL signals by using the Zadoff-chu sequences when the number of PRBs is three (the sequence length is 36) or more.

Hence, it is studied for 5G/NR to generate 60 sequences and control transmission of a UL signal when, for example, the number of IDs increases twice. However, the number of the Zadoff-chu sequence is 58 (=maximum prime number-1 equal to or less than sequence length) in a case of five PRBs (the sequence length is 60), and therefore 60 sequences cannot be generated in a case of the five PRBs or less. On the other hand, although CGSs of 60 sequences may be defined for all of one to five PRBs, there is a risk that a table design (for defining 60 sequences when the number of PRBs is large, for example) becomes complicated.

Hence, the inventors of the present invention have focused on that it is possible to increase the number of sequences by combining the number of sequences that cannot be covered by existing sequences, with separately defined sequences according to one aspect of the present invention, and have conceived an idea of controlling generation and/or transmission of a UL signal by using first sequences or second sequences defined differently from the first sequences based on sequence numbers and/or a sequence length applied to generation of the UL signal.

Furthermore, the inventors of the present invention have focused on that each UE does not necessarily need to apply the overall number of sequences depending on communication environment even when the number of sequences that can be used by the existing LTE systems is increased according to another aspect of the present invention, and have conceived an idea of employing a configuration of deciding the number of sequences (making it possible to limit the number of sequences) that are actually used based on information and/or a sequence length notified to the UE from a base station.

Embodiments according to the present invention will be described in detail below with reference to the drawings. A radio communication method according to each embodiment may be applied alone or may be applied in combination.

In addition, a sequence may be a sequence used (applied) to generate a demodulation reference signal for a UL signal (channel) and other signals.

First Embodiment

The first embodiment relates to a sequence generating method. A UE determines sequences used for generation of a UL signal based on sequence numbers (that may be referred to as sequence indices) and/or a sequence length applied to generation of the UL signal. The sequences may be selected from, for example, first sequences and second sequences.

In this regard, the first sequences may be, for example, Zadoff-chu sequences or CAZAC sequences of existing LTE (e.g., LTE Rel. 13 or 14). In this regard, the CAZAC sequences may include CG-CAZAC sequences defined by 3GPP TS 36.211 § 5.5.1.2 (e.g., Table 5.5.1.2-1).

The second sequences are sequences defined differently from the first sequences. For example, the second sequences may be sequences defined in a certain table for sequence numbers different from sequence numbers associated with the first sequences.

The sequence numbers and/or the sequence length may be notified to the UE by higher layer signaling (e.g., RRC signaling or broadcast information), physical layer signaling (e.g., DCI) or a combination of these.

Furthermore, the sequence numbers and/or the sequence length may be determined (decided) by the UE based on a certain rule. This will be described below.

The UE may generate the first sequences when the notified or determined sequence number is less than a certain value X, and generate the second sequences when the sequence number is the certain value X or more. The UE may assume that sequences of sequence numbers 0 to X-1 correspond to sequences of low mutual correlations, and sequences of sequence numbers equal to or more X are sequences of high correlation correlations. That is, the UE may assume that the first sequences include sequences of relatively low mutual correlations, and the second sequences include sequences of relatively high mutual correlations.

The certain value X may be notified to the UE by higher layer signaling (e.g., RRC signaling or broadcast information), physical layer signaling (e.g., DCI) or a combination of these. Furthermore, the certain value X may be determined (decided) by the UE according to a frequency resource size (e.g., the number of PRBs or the number of subcarriers) of a transmission signal. In addition, the frequency resource size may be read as a sequence length.

When, for example, the number of PRBs of the transmission signal is three (=the sequence length is 36) or more, X=maximum prime number-1 equal to or less than sequence length (i.e., X is the number of Zadoff-chu sequences-1) may be determined. When the number of PRBs of the transmission signal is zero to two (i.e., less than three), X=29 (that is the same as a maximum index of a CG sequence of existing LTE) may be determined.

Furthermore, when the number of PRBs of the transmission signal is equal to or more than zero and less than six, X=first value (e.g., 29) may be determined, and, when the number of PRBs is other than the above (e.g., six PRBs or more), X=second value (e.g., 59) may be determined.

The UE may assume to generate the first sequences (not to generate the second sequences and refer to the above certain table) irrespectively of the sequence numbers when the number of PRBs is a certain value (e.g., six) or more. The UE may assume that, when the number of PRBs is the certain value (e.g., six) or more, the number of sequences is maximum prime number-1 equal to or less than sequence length.

Furthermore, when the number of PRBs corresponds to a value (that is, for example, equal to or more than three and less than six, equal to or more than zero and less than two or equal to or more than zero and less than six) in a certain range, the UE may generate one of the first sequences and the second sequences based on the sequence numbers. In this case, the UE may generate the first sequences when the sequence number is, for example, a value from zero to sequence number-1, and generate the second sequences when the sequence number is a value equal to or more than the sequence length.

Furthermore, the UE may assume that, when the number of PRBs corresponds to the value in the above certain range, CAZAC sequences (CG sequences) of LTE are used for upper 30 sequences (sequences of relatively low correlations), and sequences defined in a table different from a table that defines the CG sequences are used for lower 30 sequences.

Furthermore, when the number of PRBs corresponds to the value in the above certain range, the UE may refer to a table that defines a certain number of (e.g., 60) second sequences without using the first sequences, and use the sequences listed in the table.

The UE may assume that, when, for example, the number of PRBs corresponds to the value in the above certain range, the number of sequences is a certain number (e.g., 60).

(Table Generating Method)

A method for creating a set of P (P>0 such as P=60, 90 or 120) sequences for a certain sequence length L will be described below. In this regard, the P sequences may be configured to include the first sequences and the second sequences.

First, the M first sequences are generated as sequences used when the sequence number is less than the certain value X (step S11). M may be X-1.

Next, certain modulation signals (complex numbers) (e.g., signals obtained by performing QPSK modulation on "00", "01", "11" and "10") corresponding to the sequence length L are generated for all patterns (all cases) or at random (step S12). For example, when all patterns of the QPSK modulation signals are generated for the sequence length L, $4^L$ patterns of sequences are generated. In addition, the modulation signal may not be limited to QPSK.

Furthermore, a mutual correlation between the sequences generated in step S12 and the first sequences generated in step S11 is calculated (step S13). Furthermore, a time domain signal is generated by applying Inverse Fast Fourier Transform (IFFT) to the sequences generated in step S12, and a Peak to Average Power Ratio (PAPR) of the time domain signal is measured (step S14).

P-M sequences are selected from the sequences whose mutual correlations computed in step S13 are low and whose PAPRs are low in step S14 among the sequences generated in step S12 (step S15). The sequences selected in step S15 are recorded in the table as sequences used when the sequence number is the certain value X or more.

FIG. 2 is a diagram illustrating one example of a table that defines the second sequences when the number of PRBs of the transmission signal is three (=the sequence length is 36). The table in FIG. 2 is an example of a case of M=30 (X=29).

[Mathematical 1]

A base sequence $\bar{r}_{u,v}(n)$ for generating the second sequences may be expressed by, for example, following equation 1.

$$\bar{r}_{u,v}(n)=e^{j\varphi(n)\pi/4}, 0 \le n \le M_{sc}^{RS}-1 \quad \text{(Equation 1)}$$

In this regard, u represents a sequence number, $M_{sc}^{RS}$ represents a sequence length, n corresponds to a (relative) subcarrier number that composes a transmission signal, and $\varphi(n)$ represents a value illustrated in FIG. 2.

According to the table generating method in steps S11 to S15, P CG sequences do not need to be generated. That is, the number of PRBs of the transmission signal is less than six, and therefore the P CG sequences do not need to be looked up for each sequence length, and the P-M CG sequences only need to be generated. Consequently, it is possible to suppress a pre-calculation amount for actually determining sequences according to the first embodiment, and define sequences for NR at low cost and in a relatively short time.

According to the above-described first embodiment, it is possible to use a larger number of sequences than those of existing LTE even when the number of PRBs of the transmission signal is less than six.

Second Embodiment

Although the number of allocatable (distinguishable) cells increases as the number of sequences increases, a probability that sequences of high PAPRs are used and sequences of high mutual correlations are used between neighbor cells also increases. The inventors of the present invention have studied that a network (base station) controls sequences used by a UE to deal with this situation, and have found the second embodiment.

The second embodiment relates to a method for limiting the number of sequences that are actually used. According to the second embodiment, when, for example, the overall number of sequences (that may be referred to as a total number of sequences or the defined (configured) number of sequences) is P, the number of sequences used by a certain UE is limited to N (N≤P).

Information related to the limited number of sequences N (the number of sequences N used by (available for) a certain cell) may be notified (configured) to the UE by higher layer signaling (e.g., RRC signaling or broadcast information), physical layer signaling (e.g., DCI) or a combination of these.

In a case of, for example, P=60, information explicitly indicating N may be indicated among N candidates (e.g., {60, 30, 20, 10}). Furthermore, after these N candidates are notified to the UE in advance by higher layer signaling, indices for specifying the N candidates may be notified by another signaling (another higher layer signaling or physical layer signaling).

Furthermore, the information related to N may be a value indicating a rate with respect to the overall number of sequences P. When, for example, N is defined as 1/integer multiple of P, the information related to N may be the integer (e.g., 2, 3, 4, 5 and . . . ). The UE can decide N=P/2 when, for example, two is notified as the integer value. In addition, N may be expressed in optional forms such as a percentage with respect to P or a multiple of a decimal. Furthermore, when N is not an integer, it may be assumed that the UE rounds or rounds down N and converts N into an integer. Alternatively, it may be assumed that the UE selects a value that is the closest to candidates (e.g., N={5, 10, 20, 30}) of certain values determined in advance by a specification.

In addition, information related to the overall number of sequences P may be notified to the UE by higher layer signaling (e.g., RRC signaling or broadcast information), physical layer signaling (e.g., DCI) or a combination of these. Furthermore, the overall number of sequences P may be determined (decided) by the UE based on a certain rule.

For example, the UE may assume P=30 when the number of PRBs of a transmission signal is equal to or more than zero and less than three, and P=maximum prime number-1 equal to or less than sequence length when the number of PRBs is three or more. Furthermore, as assumed in the above first embodiment, the UE may assume P=60 and P=maximum prime number-1 equal to or less than sequence length when the number of PRBs corresponds to a value (that is, for example, equal to or more than zero and less than six) in the certain range.

The limited number of sequences N may be associated with the sequence length and notified. That is, when a plurality of Ps are defined, different Ns may for respective Ps may be notified, or N may be configured to be uniformly derivable irrespectively of values of P by using a form of above 1/multiple of P.

When the number of sequences N is smaller than the overall number of sequences P, the UE may assume to use sequences specified according to the certain rule among the sequences of the number of sequences P defined in advance. The sequences specified according to the certain rule may be, for example, sequences of smaller sequence numbers than a certain sequence number (that may be referred to as a reference sequence numbers) defined in advance.

In addition, information related to the reference sequence number may be notified to the UE by higher layer signaling (e.g., RRC signaling or broadcast information), physical layer signaling (e.g., DCI) or a combination of these.

When, for example, P=60, N=30 and reference sequence number=30 are configured, the UE may assume to use sequences of sequence numbers 0 to 29. Consequently, even when the number of sequences is limited, it is possible to make the UE select sequences of low mutual correlations and low PAPRs.

The UE may assume that all sequences of the number of sequences P defined in advance are usable when the information related to N is not notified, and N is a default value (e.g., N=30). The default value of N may be notified by higher layer signaling or may be defined by the specification.

According to the above-described second embodiment, it is possible to perform operations that support both of a case where the network needs to increase the number of sequences, allocate a different sequence to each cell and perform an operation, and a case where the network needs to decrease the number of sequences, and allocate a sequence of a low mutual correlation to each cell.

Third Embodiment

The third embodiment relates to a method for determining sequence numbers in a UE. According to the third embodiment, the UE may determine sequence numbers for use within a range equal to or more than zero and equal to or less than P-1 (or N-1 (a case where a limitation is placed as described in the second embodiment) according to a certain rule.

For example, the UE may determine the sequence numbers for use based on at least one of a cell ID, a transmission signal resource (e.g., time and/or frequency resources), a beam index (and/or a beam group index) of a transmission signal, N and P or a combination of these. In addition, from a viewpoint to suitably suppress an inter-cell interference, it is preferable to determine the sequence numbers for use based on at least the cell IDs.

The cell IDs may be notified to the UE by a synchronization signal, a synchronization signal block, higher layer signaling (e.g., RRC signaling or broadcast information), physical layer signaling (e.g., DCI) or a combination of these.

Information related to the transmission signal resource may be notified to the UE by higher layer signaling (e.g., RRC signaling or broadcast information), physical layer signaling (e.g., DCI) or a combination of these. The information related to the transmission signal resource may be information for specifying a PRB index, a symbol index and a slot index related to, for example, a PUCCH resource. In this regard, the PRB index and the symbol index may be indices corresponding to a minimum (or maximum) resource position among resources allocated by a network.

The sequence numbers for use may be found according to, for example, one of following equation 2 to equation 5 (N may be replaced with P).

Sequence number=cell ID mod N  (Equation 2)

Sequence number=PRB index mod N  (Equation 3)

Sequence number=symbol index mod N  (Equation 4)

Sequence number=(cell ID+PRB index+symbol index) mod N  (Equation 5)

In addition, the computed sequence numbers may be hopped (subjected to, for example, frequency hopping per certain time periodicity) according to a certain hopping pattern.

Information related to the certain rule and information related to the hopping pattern may be notified to the UE by higher layer signaling (e.g., RRC signaling or broadcast information), physical layer signaling (e.g., DCI) or a combination of these.

Figure 3B:
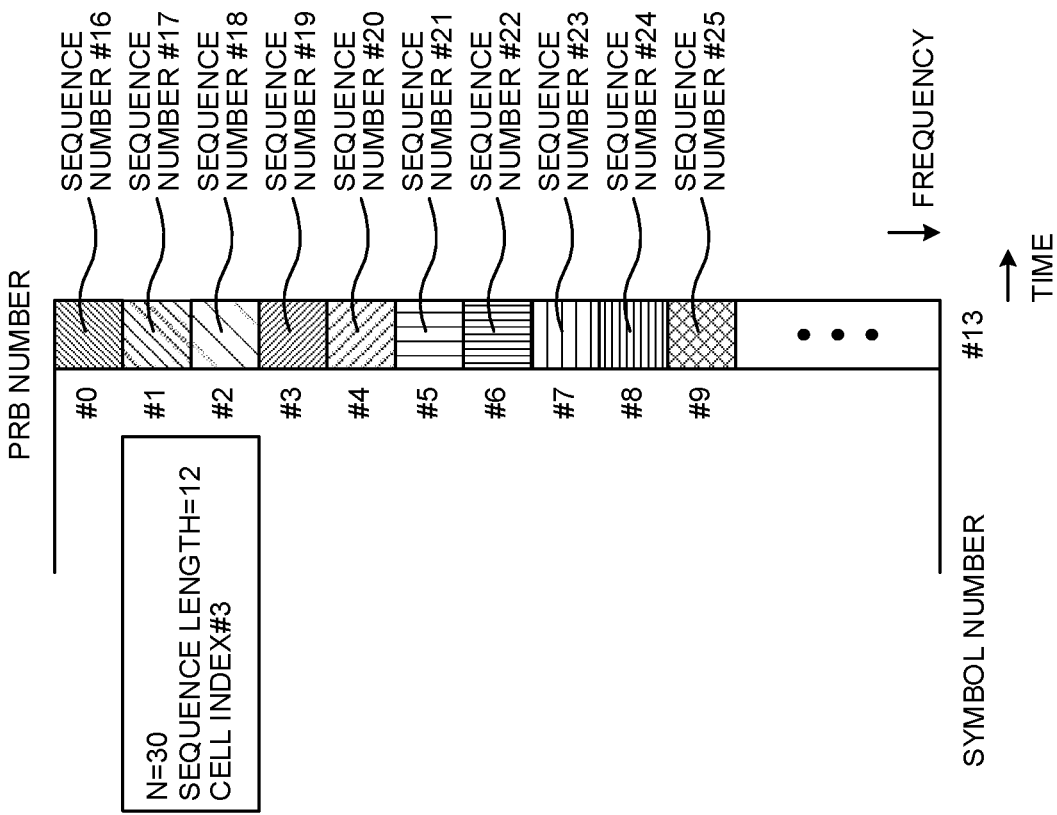
FIGS. 3A and 3B are diagrams illustrating one example of sequence numbers determined by using a third embodiment.
Figure 3A:
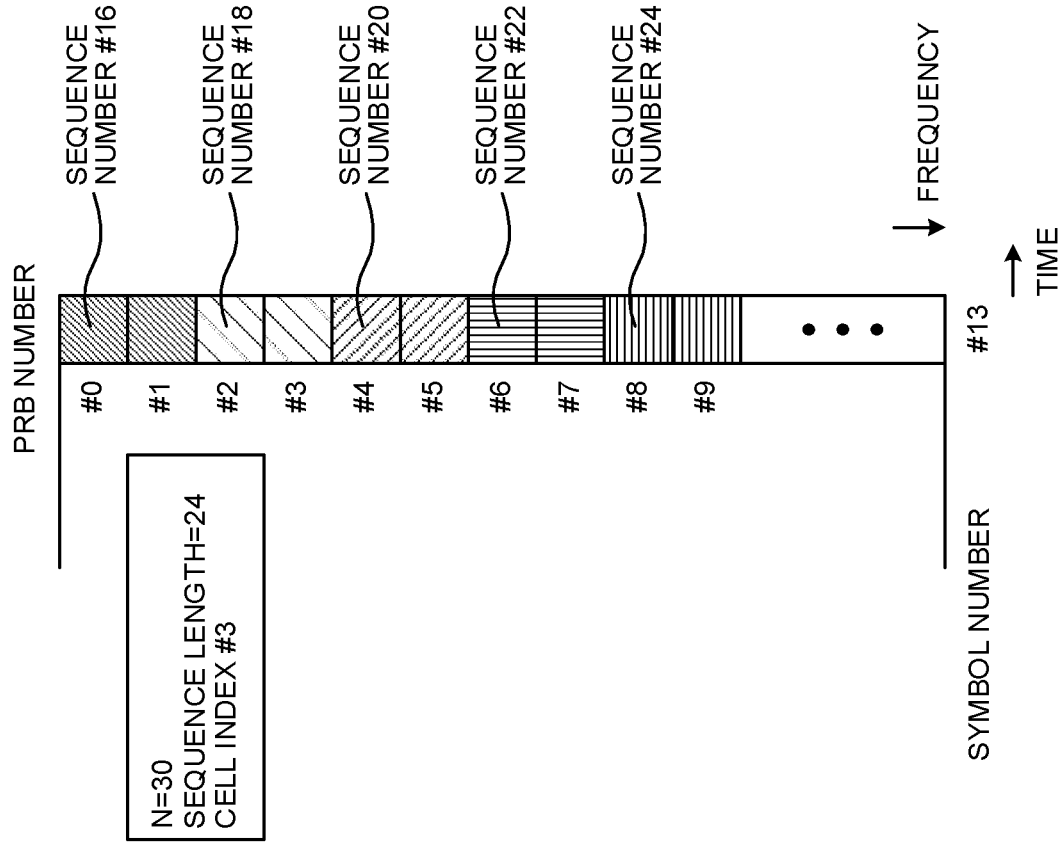

FIGS. 3A and 3B are diagrams illustrating one example of sequence numbers determined by using the third embodiment. In this example, assuming N=30, the UE transmits a sequence by using a symbol index #13 to a cell of a cell ID #3. The sequence numbers are assumed to be computed by using equation 5.

FIG. 3A corresponds to sequence length=12, and FIG. 3B corresponds to sequence length=24. In a case of FIG. 3A, sequence numbers #16 to #25 are used for transmission signals of PRB indices #0 to #9. In a case of FIG. 3B, sequence numbers #16, #18, #20, #22 and #24 are used for transmission signals of two PRBs starting from the PRB indices #0, #2, #4, #6 and #8, respectively.

According to the above-described third embodiment, the UE can specify sequence numbers based on a cell ID even when the sequence numbers are not notified from the network, and consequently reduce an information amount for notifying the sequence numbers.

(Radio Communication System)

The configuration of the radio communication system according to one embodiment of the present invention will be described below. This radio communication system uses one or a combination of the radio communication method according to each of the above embodiments of the present invention to perform communication.

Figure 4:
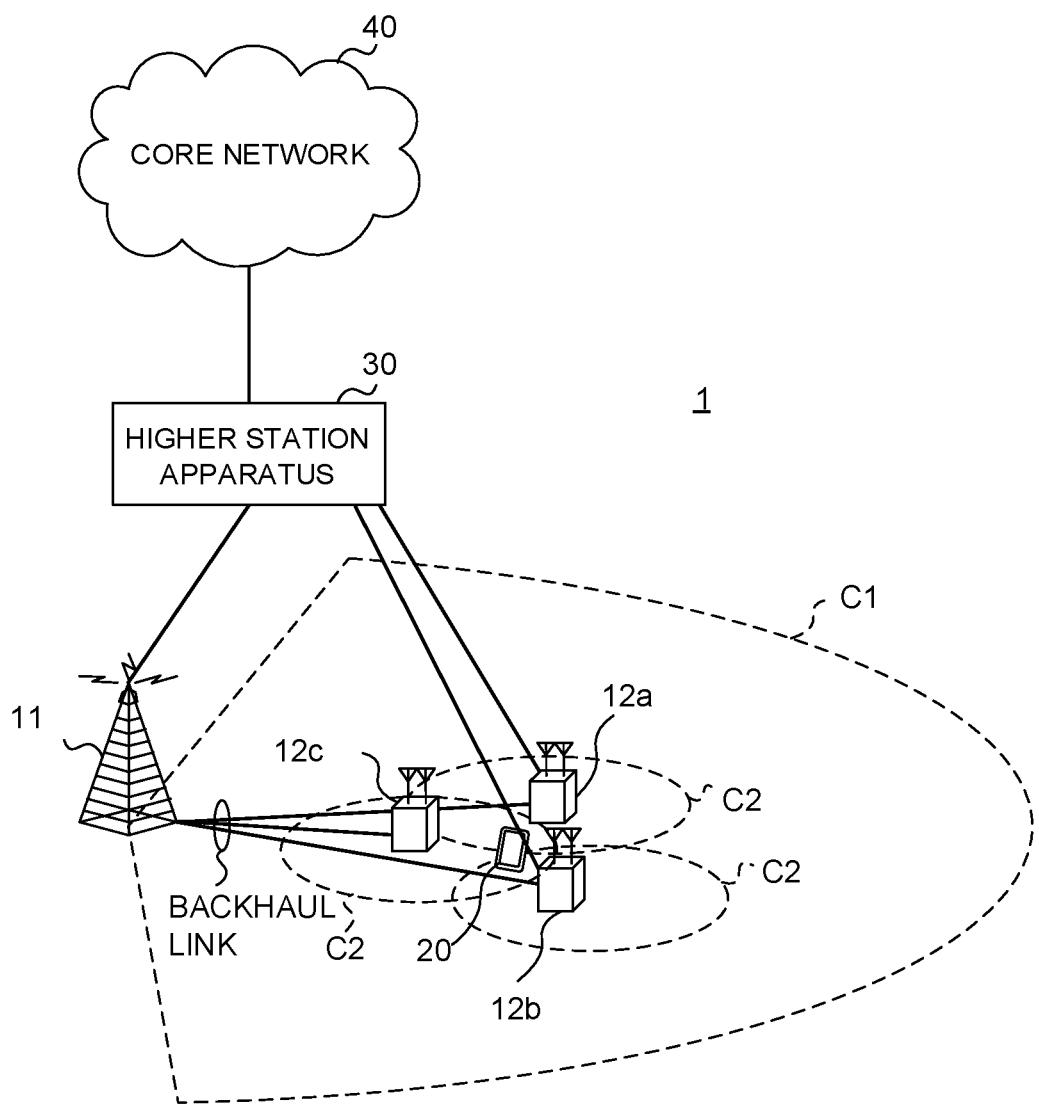
FIG. 4 is a diagram illustrating one example of a schematic configuration of a radio communication system according to one embodiment of the present invention.

FIG. 4 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the number of respective cells and user terminals 20 are not limited to those illustrated in FIG. 4.

The user terminal 20 can connect with both of the radio base station 11 and the radio base stations 12. The user terminal 20 is assumed to concurrently use the macro cell C1 and the small cells C2 by CA or DC. Furthermore, the user terminal 20 may apply CA or DC by using a plurality of cells (CCs) (e.g., five CCs or less or six CCs or more).

The user terminal 20 and the radio base station 11 can communicate by using a carrier (an existing carrier that is also referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band of one or contiguous resource blocks per terminal and causes a plurality of terminals to use respectively different bands to reduce an interference between the terminals. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIB) are transmitted on the PDSCH. Furthermore, Master Information Blocks (MIB) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH.

In addition, scheduling information may be notified by DCI. For example, the DCI for scheduling reception of DL data may be referred to as a DL assignment, and the DCI for scheduling transmission of UL data may be referred to as a UL grant.

The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with cells is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

(Radio Base Station)

Figure 5:
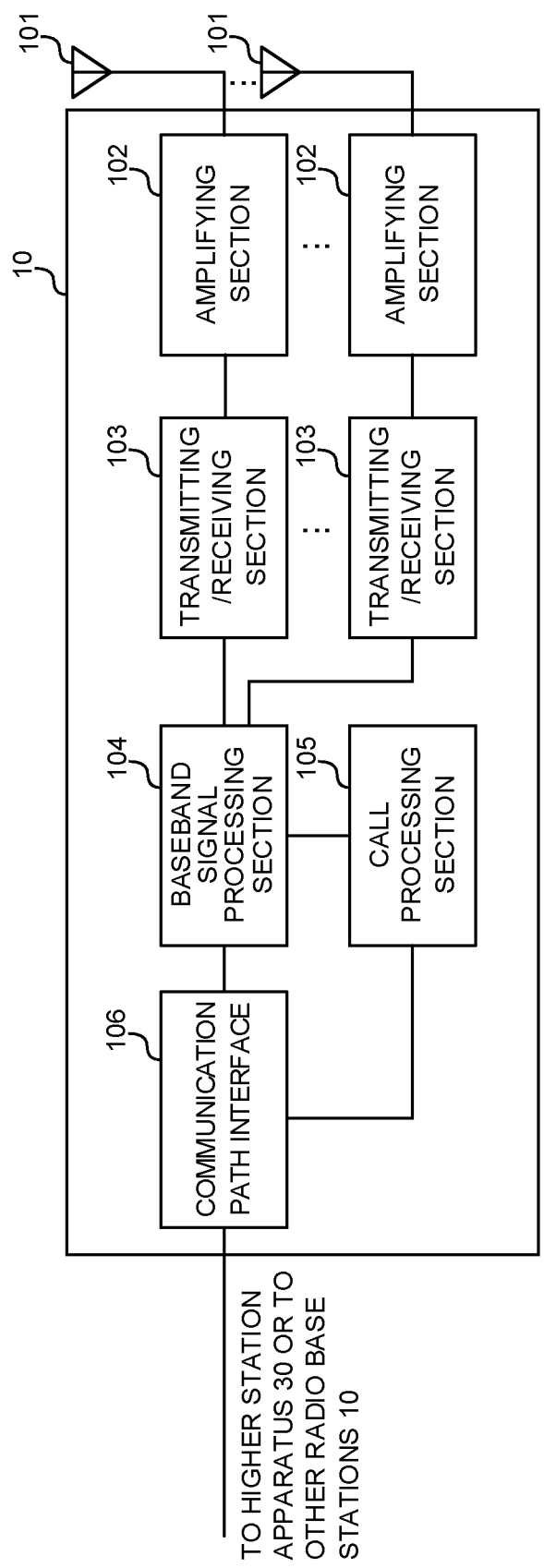
FIG. 5 is a diagram illustrating one example of an overall configuration of a radio base station according to the one embodiment of the present invention.

FIG. 5 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10, and radio resource management.

The channel interface 106 transmits and receives signals to and from the higher station apparatus 30 via a certain interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Furthermore, each transmission/reception section 103 may receive a UL signal (e.g., DMRS-based and/or sequence-based PUCCHs) including UL Control Information (UCI) and/or a Scheduling Request (SR). Furthermore, each transmission/reception section 103 may transmit information related to sequence numbers used for transmission of the UL signal, information related to the number of sequences used by each cell, information (PRB indices and/or symbol indices) related to allocation of PUCCH resources, and information related to cell IDs.

Figure 6:
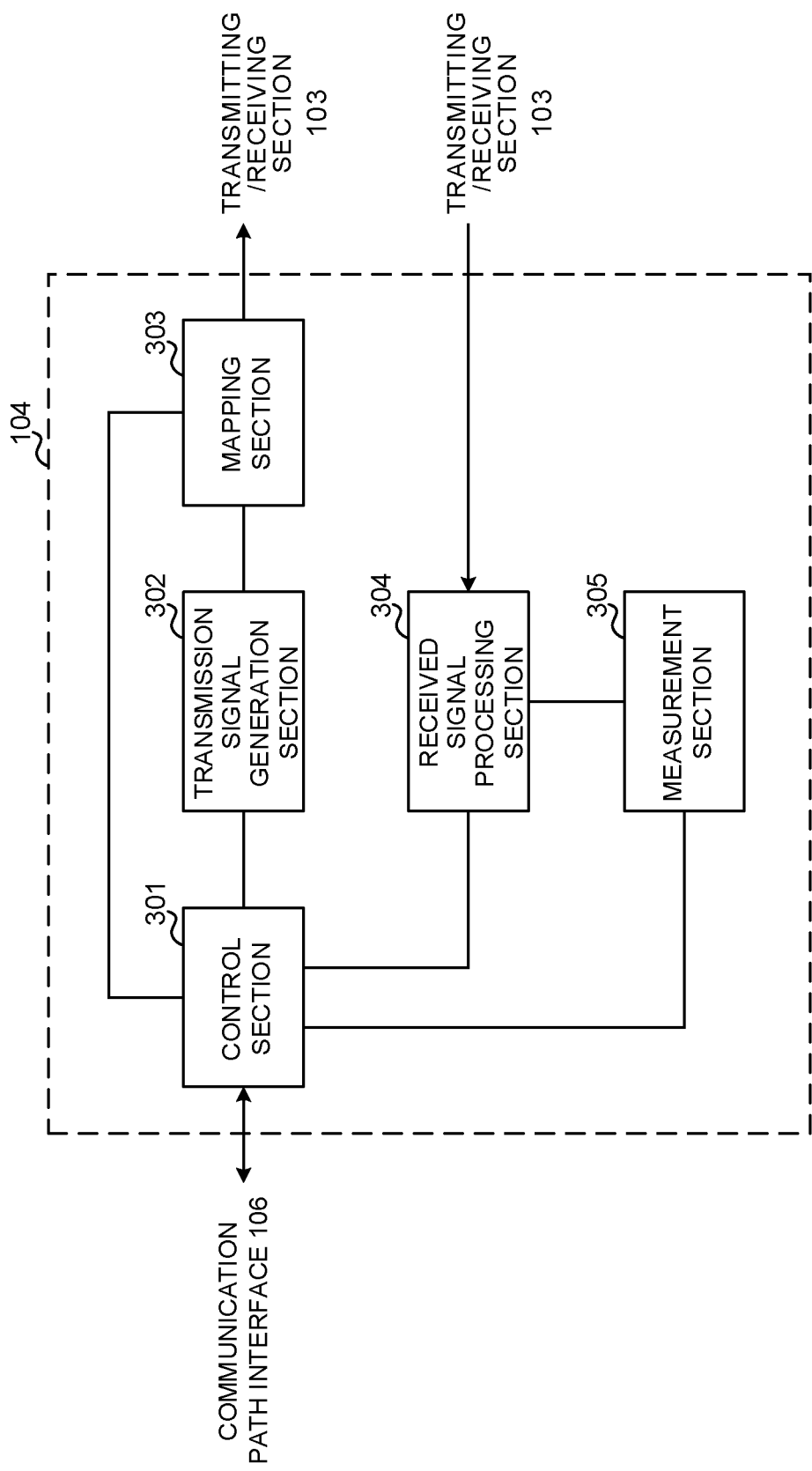
FIG. 6 is a diagram illustrating one example of a function configuration of the radio base station according to the one embodiment of the present invention.

FIG. 6 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components do not necessarily need to be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

The control section 301 may control the number of sequences N used by the user terminal 20 in a certain cell. When, for example, the number of usable sequences is 60 sequences, the control section 301 may perform control to limit the number of sequences used by the user terminal 20 for transmission of the UL signal to part of the overall number of sequences (e.g., 30 sequences) based on, for example, communication environment.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a certain radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement and Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., Received Signal Strength Indicator (RSSI)) or channel information (e.g., CSI). The measurement section 305 may output a measurement result to the control section 301.

(User Terminal)

Figure 7:
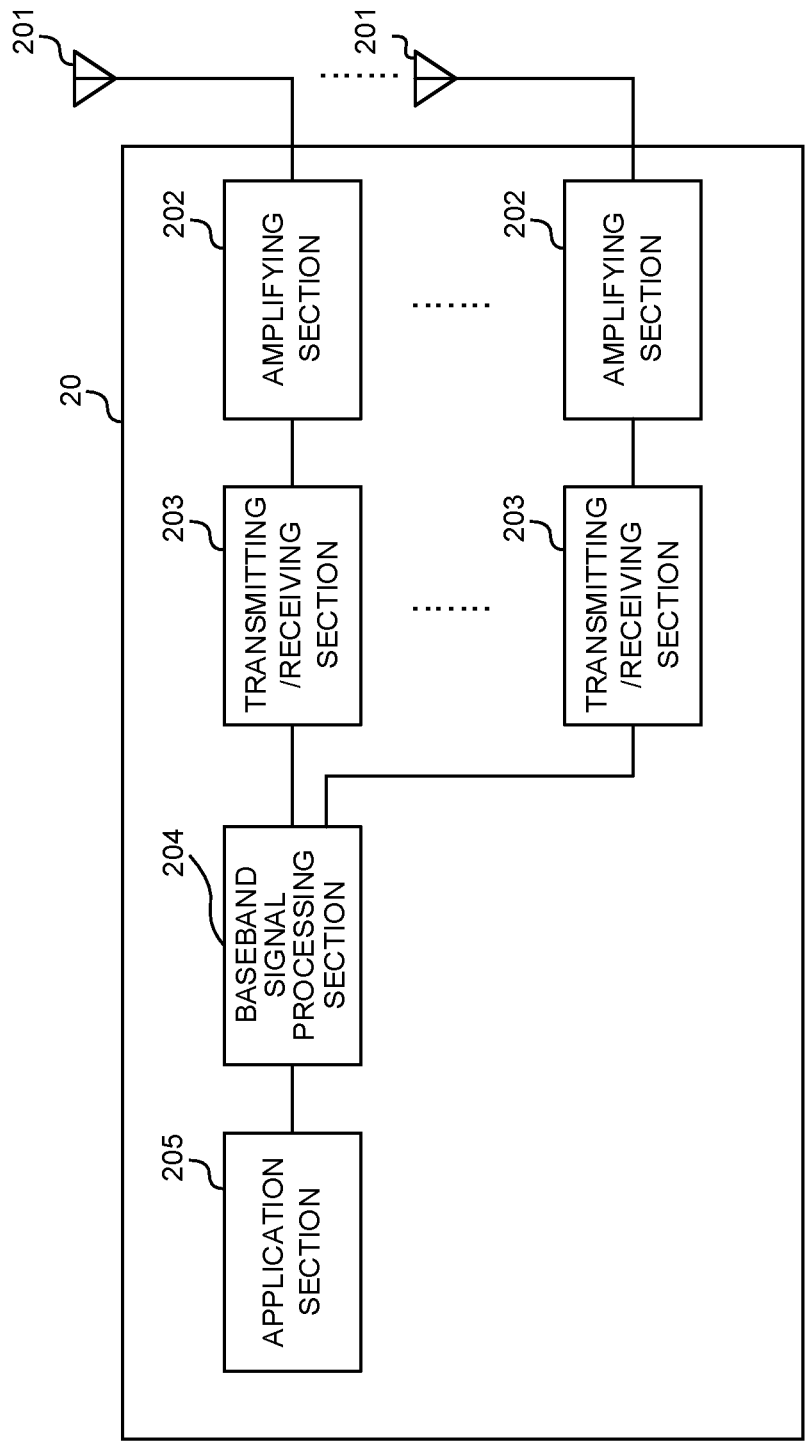
FIG. 7 is a diagram illustrating one example of an overall configuration of a user terminal according to the one embodiment of the present invention.

FIG. 7 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information, too, among the downlink data to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 may transmit UL signals (e.g., DMRS-based and/or sequence-based PUCCHs) including UL Control Information (UCI) and/or a Scheduling Request (SR). Furthermore, each transmission/reception section 203 may receive information related to sequence numbers used for transmission of a UL signal, information related to the number of sequences used by each cell, information (PRB indices and/or symbol indices) related to allocation of PUCCH resources, and information related to cell IDs.

Figure 8:
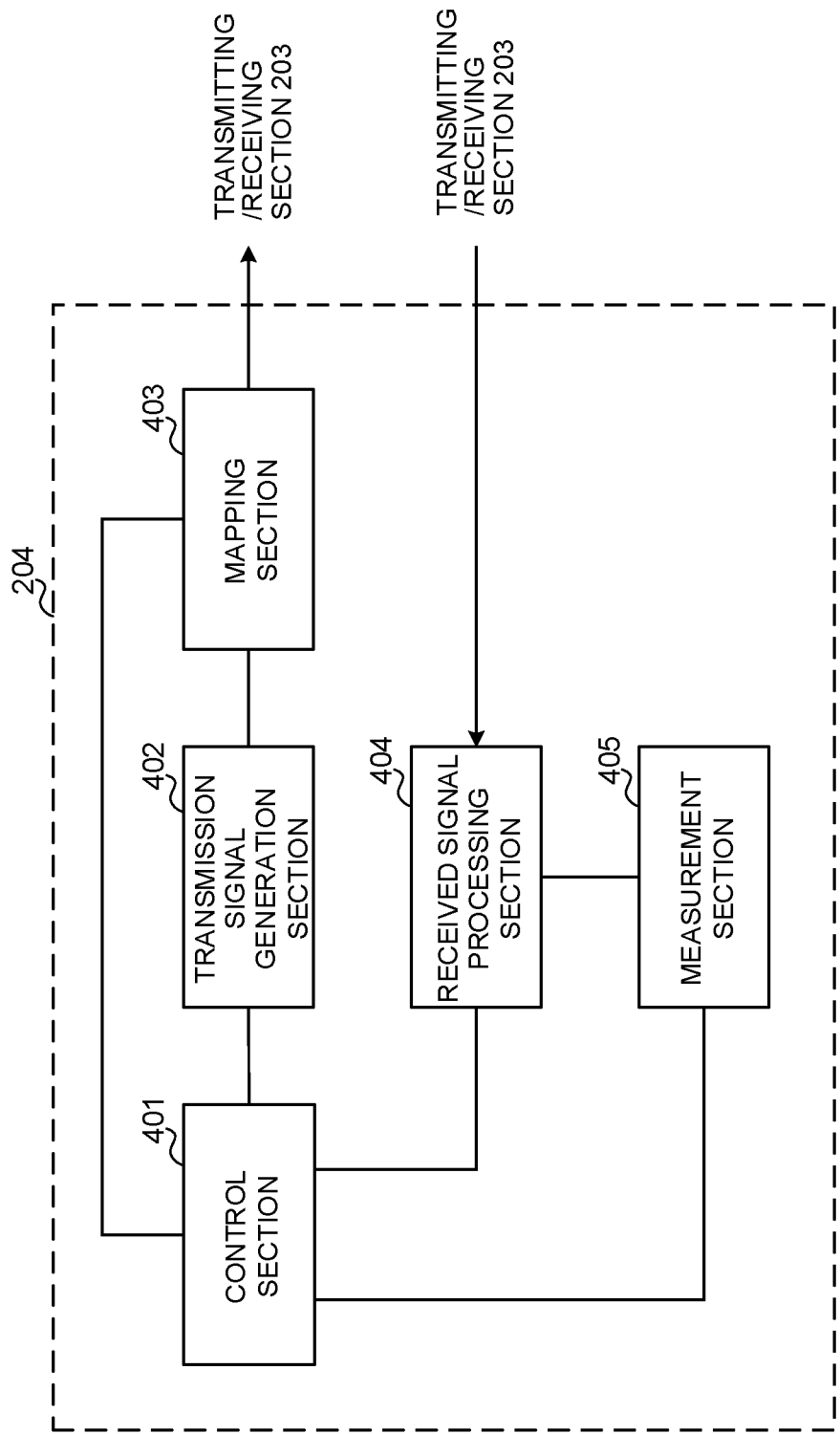
FIG. 8 is a diagram illustrating one example of a function configuration of the user terminal according to the one embodiment of the present invention.

FIG. 8 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components do not necessarily need to be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains, from the received signal processing section 404, a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 controls transmission of a UL signal to which certain sequences have been applied. For example, the control section 401 controls transmission of the UL signal by using the first sequences or the second sequences defined differently from the first sequences based on sequence numbers and/or a sequence length applied to generation of the UL signal. The control section 401 may select one of the sequences included in the first sequences and the second sequences based on at least one of the sequence numbers and the sequence length notified from the radio base station 10 or determined by the control section 401, and perform control to transmit the UL signal by using the sequences.

The first sequences may be Zadoff-chu sequences and/or CAZAC sequences applied according to LTE Rel. 14 (or releases prior to Rel. 13). Furthermore, the second sequences may be sequences defined in a certain table for sequence numbers (e.g., 30 to 59) different from sequence numbers (e.g., 0 to 29) associated with the first sequences (see FIG. 2).

The control section 401 may use the first sequences when the sequence number is less than a certain value (X), and use the second sequences when the sequence number is the certain value or more. Furthermore, the control section 401 may decide the certain value based on the sequence length (e.g., the number of PRBs). In addition, the control section 401 may determine the certain value X based on a frequency resource size (or the sequence length) of a transmission signal. For example, X may be determined as maximum prime number-Z (Z is an integer) equal to or less than sequence length when the sequence length of the transmission signal is the certain value (e.g., 36) or more, and may be determined as X=specific value (e.g., 29 or 59) when the sequence length of the transmission signal is less than the certain value.

The control section 401 may use the first sequences irrespectively of the sequence numbers when the sequence length is the certain value or more, and apply the second sequences according to the sequence numbers when the sequence length is less than the certain value.

In addition, "less than" may be read as "equal to or less than", and "equal to or more than" may be read as "more than".

Alternatively, the control section 401 may decide the number of sequences equal to or less than the defined overall number of sequences based on information and/or the sequence length notified from the base station, and control transmission of the UL signal to which the sequence numbers selected from the number of sequences have been applied.

The control section 401 may use sequences of smaller sequence numbers than the reference sequence number defined in advance among overall sequences when the number of sequences is smaller than the overall number of sequences. Furthermore, the control section 401 may control transmission of the UL signal assuming that the overall sequences are applicable when information related to the number of sequences is not notified from the base station.

The control section 401 may determine the sequence number based on at least one of a cell identifier, a PRB number used for UL transmission, a symbol number, a beam index and a beam group index.

The transmission signal generating section 402 generates an uplink signal (such as an uplink control signal, an uplink data signal and an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement and CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

(Hardware Configuration)

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by way of, for example, wired connection and/or radio connection).

Figure 9:
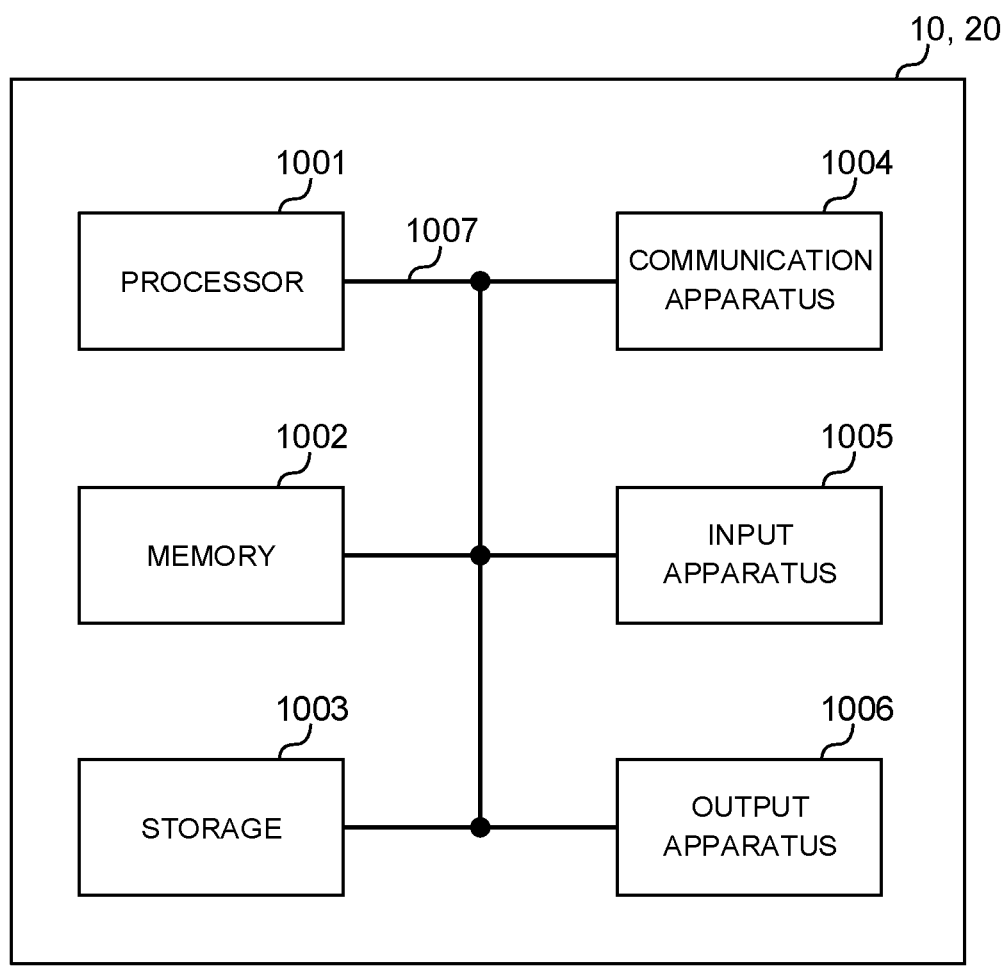
FIG. 9 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 9 is a diagram illustrating one example of hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read certain software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001 or other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

MODIFIED EXAMPLE

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., one ms) that does not depend on the numerology.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for transmitting signals. The other corresponding names of the radio frame, the subframe, the slot, the mini slot and the symbol may be used. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to existing LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a data packet (transport block) subjected to channel coding, a code block and/or a codeword or may be a processing unit of scheduling or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding one ms, and the short TTI (e.g., the reduced TTI) may be read as a TTI having a TTI length less than the TTI length of the long TTI and equal to or more than one ms.

Resource Blocks (RBs) are resource block allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots included in a subframe or a radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to certain values or may be expressed by using other corresponding information. For example, a radio resource may be indicated by a certain index.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of certain information (e.g., notification of "being X") may be made not only explicitly but also implicitly (by, for example, not notifying this certain information or by notifying another information).

Decision may be performed based on a value (0 or 1) expressed by one bit, may be performed based on a boolean expressed by true or false or may be performed by comparing numerical values (e.g., comparison with a certain value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A),LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, in this description, when the two elements are connected, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description intends for exemplary explanation, and does not have any restrictive meaning to the present invention.

The invention claimed is:

1. A terminal comprising:
 a receiver that receives, via higher layer signaling, information related to a number of a plurality of sequences, the number being restricted to a number less than a certain number; and
 a processor that controls signal transmission using a sequence that is selected out of the plurality of sequences.

2. The terminal according to claim 1, wherein the processor selects, based on the information, the sequence for the signal transmission from out of the plurality of sequences.

3. A radio communication method for a terminal, the method comprising:
 receiving, via higher layer signaling, information related to a number of a plurality of sequences, the number being restricted to a number less than a certain number; and
 controlling signal transmission using a sequence that is selected out of the plurality of sequences.

4. A system comprising a base station and a terminal, wherein:
 the base station comprises:
  a transmitter that transmits, via higher layer signaling, information related to a number of a plurality of sequences, the number being restricted to a number less than a certain number, and
 the terminal comprises:
  a receiver that receives, via higher layer signaling, the information; and
  a processor that controls signal transmission using a sequence that is selected out of the plurality of sequences.

* * * * *